United States Patent [19]

Hiestand

[11] Patent Number: 4,527,808
[45] Date of Patent: Jul. 9, 1985

[54] CHUCK FOR MACHINE TOOLS

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 460,010

[22] Filed: Jan. 21, 1983

[30] Foreign Application Priority Data

Feb. 10, 1982 [DE] Fed. Rep. of Germany ....... 3204529

[51] Int. Cl.³ ............................................. B23B 31/02
[52] U.S. Cl. .................................... 279/1 J; 242/68.4; 279/1 L
[58] Field of Search ..................... 279/1 DC, 1 J, 1 L, 279/1 DA, 4, 1 P, 1 R, 110, 121; 409/234; 269/134, 136; 242/68.4

[56] References Cited

U.S. PATENT DOCUMENTS 1,812,006  6/1931  Jellicoe ................. 279/1 L
2,893,744  7/1959  Anthony ............... 279/121
4,094,522  6/1978  Hiestand ............... 279/121
4,275,892  6/1981  Rohm .................... 279/121

FOREIGN PATENT DOCUMENTS 2521047  8/1983  France ................... 279/121
2035178  6/1980  United Kingdom ...... 279/1 DC
2096926  10/1982 United Kingdom ...... 279/1 DC Primary Examiner—Gil Weidenfeld
Assistant Examiner—Daniel W. Howell
Attorney, Agent, or Firm—McGlew and Tuttle

[57] ABSTRACT

In a chuck (1) for lathes (4), which is provided with a compensating jaw set (61) for adaptation to unequal workpieces (2) and with a centering jaw set (21) engaging at axial spacing therefrom, the centering jaws (22) are guided normal to the longitudinal axis (A) of the chuck for adjustment in centering jaw heads (16) axially displaceable to a limited extent, which centering jaw heads can be coupled through axis-parallel connecting elements (19) with a common positioning member (18). Also, the connecting elements (19) are provided with wedge surfaces (32,33), by means of which the axial adjustment movement of the adjusting member (18) is deflectable into a radial feed movement. By this design, it is possible to clamp a workpiece (2) in the region (6) to be machined reliably in centered position and thereafter compensatorily, the centering jaws (22) being positioned axis-normal to the workpiece (2) and always engaging at an equal selectable distance from the compensating jaws (62), and this independently of the workpiece diameter.

12 Claims, 4 Drawing Figures

CHUCK FOR MACHINE TOOLS

BACKGROUND OF THE INVENTION

Field of the Invention

This invention relates, in general, to the construction of chucks and, in particular, to a new and useful chuck for machine tools which includes both centering jaw heads and compensating jaw heads.

The invention relates to a chuck for lathes or similar machine tools with a compensating jaw set to be actuated through a compensating means for adaptation to irregular workpieces and with a centering jaw set to be actuated independently thereof whose jaws engage the outer faces of the workpiece in axial spacing from the compensating jaws and can be retracted out of the centering region.

A chuck of this kind is known from DE-PS No. 18 00 271. The centering jaws, on the clamping side ends of which jaws acting on the workpiece to be clamped are detachably applied, are formed by rods which slide in cylindrical bores in the chuck body. However, since the axes of these bores converge toward the clamping side end, the jaws acting on the workpiece are displaced also in the axial direction. The workpiece is thus subject to an additional, axially directed stress. This sometimes leads to an axial displacement of the workpiece so that the clamped position in not exact. Besides, the overall dimensions of this chuck design are very large in the axial and also in the radial directions due to the rod type centering jaws inclined to the longitudinal axis of the chuck. However, the clamping range is small because the radial feed of the jaws depends on the slant of the centering jaws. Another disadvantage is that for different workpiece diameters the jaws make contact at different axial distances from the clamping point of the jaw set. This complicated chuck is therefore not suitable for versatile use especially in automated clamping operations.

SUMMARY OF THE INVENTION

The invention provides a chuck by means of which a workpiece can be clamped reliably centered at the point to be machined, and this independently of the respective workpiece diameter. The clamping range of the chuck can readily be made large, and the centering jaws are adjusted during the clamping operation axis-normal to the workpiece, so that axial displacements of the workpiece are avoided. The centered clamping is effected at always equal selectable distance from the clamping region of the jaw set. In addition there is great adaptability of the workpieces which are to be machined centrically at a certain point but which are irregular and must therefore be clamped eccentrically during the machining process. And above all the centric and compensating clamping of workpiece, in order, e.g. to compensate end curvatures of pipes intended for drilling as they are being machined, can be effected in a short time and also sequentially controlled, so that the clamping processes can be automated and the chuck can be integrated into the work cycle of a machine tool.

According to the invention, the jaws of the centering jaw set are adjustably guided directly or through base jaws normal to the longitudinal axis of the chuck in a centering jaw head which is held for limited axial displacement in a recess machined into the chuck body. The centering jaws or base jaws and the centering jaw heads associated with them can be coupled with a common positioning member through a ram type connecting elements arranged axis-parallel to the longitudinal axis of the chuck. The connecting elements are provided in the region engaging in the centering jaws or base jaws with wedge surfaces inclined in axial directions by means of which the axial adjustment movement of the positioning member can be transformed into common radially directed feed movements through counter-surfaces provided at the centering jaws or base jaws when the clamping heads are fixed in the forward end position.

Expediently the connecting elements traverse the centering jaw heads associated with them in a centered recess machined into the latter. This makes for a space-saving arrangement.

The wedge surfaces provided for radial displacement of the centering jaws or base jaws can, in a simple realization, be formed by a nose inclined in axial direction which is provided at the end of the connecting elements facing said wedge surfaces, which noses engage in an associated groove machined into the centering jaws or base jaws.

For economic machining it is further desirable to make the centering jaw heads and the base jaws inserted therein cylindrical with preferably equal outside diameters, and to form the recesses receiving them as cylindrical bores.

For non-rotational retention of the centering jaw heads these may be provided with preferably two diametrically opposite, axis-parallel guide faces which apply against counter-faces on the chuck body.

The displacement path of the centering jaw heads is to be limited at least in feed direction by a stop provided on the chuck body. Thereby the centering jaws heads are fixed, so that the further adjustment movement of the adjustment member is now transferred (deflected) by means of the wedge and counter-faces into a radial feed movement of the centering jaws or base jaws.

The stops limiting the feed movement of the centering jaw heads may be formed by preferably axially displaceable stop strips or adjusting screws which are arranged on the end face of the chuck and which partially cover the recesses receiving the centering jaw heads on one or both sides, and with which there cooperate stop surfaces at the centering jaw heads formed for example by shoulders; in which case the counter-faces cooperating with the guide surfaces of the centering jaw heads can likewise be formed by the stop strips.

The stops limiting the return movement of the centering jaw heads can each be formed by a shoulder provided in the recess receiving the heads, by which shoulder the centering jaw head, preferably T-shaped in longitudinal section, cooperates with an abutment surface.

To limit the return movement of the centering jaws it is further appropriate to provide each of the connecting elements with a cutout extending in an axial direction, and to provide the associated centering jaw head with a stop pin which engages in the cutout. It is thereby prevented that during movement the connecting elements come out of engagement with the centering jaws or base jaws.

To permit a preassembly of the clamping elements and to minimize the friction forces occurring upon axial displacement of the base jaws in the recesses receiving the centering jaw heads, it is further desirable to connect the connecting elements with the associated centering jaw head through a preferably tensioned spring. The spring may be inserted into an annular groove type cutout machined into the centering jaw heads and be supported thereon and on the connecting elements.

As positioning member there by may be provided in simple realization an axially displaceable positioning piston disposed in the chuck body, to be admitted by pressure medium on both sides, which positioning member may be formed as a ring piston with at least one tubular projection which projects axially therefrom in the inner or outer region and which is guided in the chuck body.

The chuck according to the invention permits not only a rapid and reliable centering of the region to be machined of irregular workpieces, but it also ensures that the centering jaws are displaced during the clamping movement axis-normal to the longitudinal axis of the chuck and always engage at the workpiece at a selectable distance from the clamping point of the compensating jaws. For if the centering jaws are inserted in a centering jaw head guided for axial displacement in the chuck and to be actuated by a common positioning member, it is possible to clamp a workpiece at the point to be machined reliably centered and to abolish this clamping as soon as by means of the compensating device, which may be designated in various ways, the compensating jaws clampingly apply on the workpieces. At centered clamping the clamping forces execute at first an axial movement by a certain adjustment path and are fixed in this position, so that the further adjustment movement of the positioning member is thereafter transformed through the wedge faces provided at the connecting elements into a radial feed movement of the centering jaws. In this way, it is assured that independently of the respective diameter of the workpiece to be machined the workpiece is always clamped at the same distance from the compensating jaw set.

Furthermore, the adjustment range of the centering jaws can be selected large according to the inclination and length of the wedge faces and the counter-faces cooperating therewith, so that also workpieces of different diameter can be safely clamped without difficulties. And since the centering jaws always act on the workpiece normal to the longitudinal axis thereof, the workpiece is not stressed axially during the clamping process and hence is not displaced, so that imprecise clamping need not be reckoned with. Of special advantage is further that the centered clamping and the subsequent eccentric clamping of an irregular workpiece can be carried out in a short time and that the individual clamping processes can be sequentially controlled. The chuck according to the invention can thus be integrated into the cycle of a machine tool. And since the construction and manufacturing cost is low, economical production is provided as well.

Accordingly, it is an object of the invention to provide an improved chuck which includes jaw heads which are movable axially in a chuck body and means for regulating associated ones of base jaws which move radially to engage a workpiece which includes means for compensating for irregularities of the workpiece by permitting movement of the compensating jaws by amounts to permit engagement of the jaws independently of any irregularities of the workpiece and also to a chucking arrangement wherein the jaws base are advanced after movement of a clamping head of the jaw in an axial direction to an end position so that the final jaw engagement pressure may be applied after all of the jaws have engaged the workpiece.

A further object of the invention is to provide a chuck which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
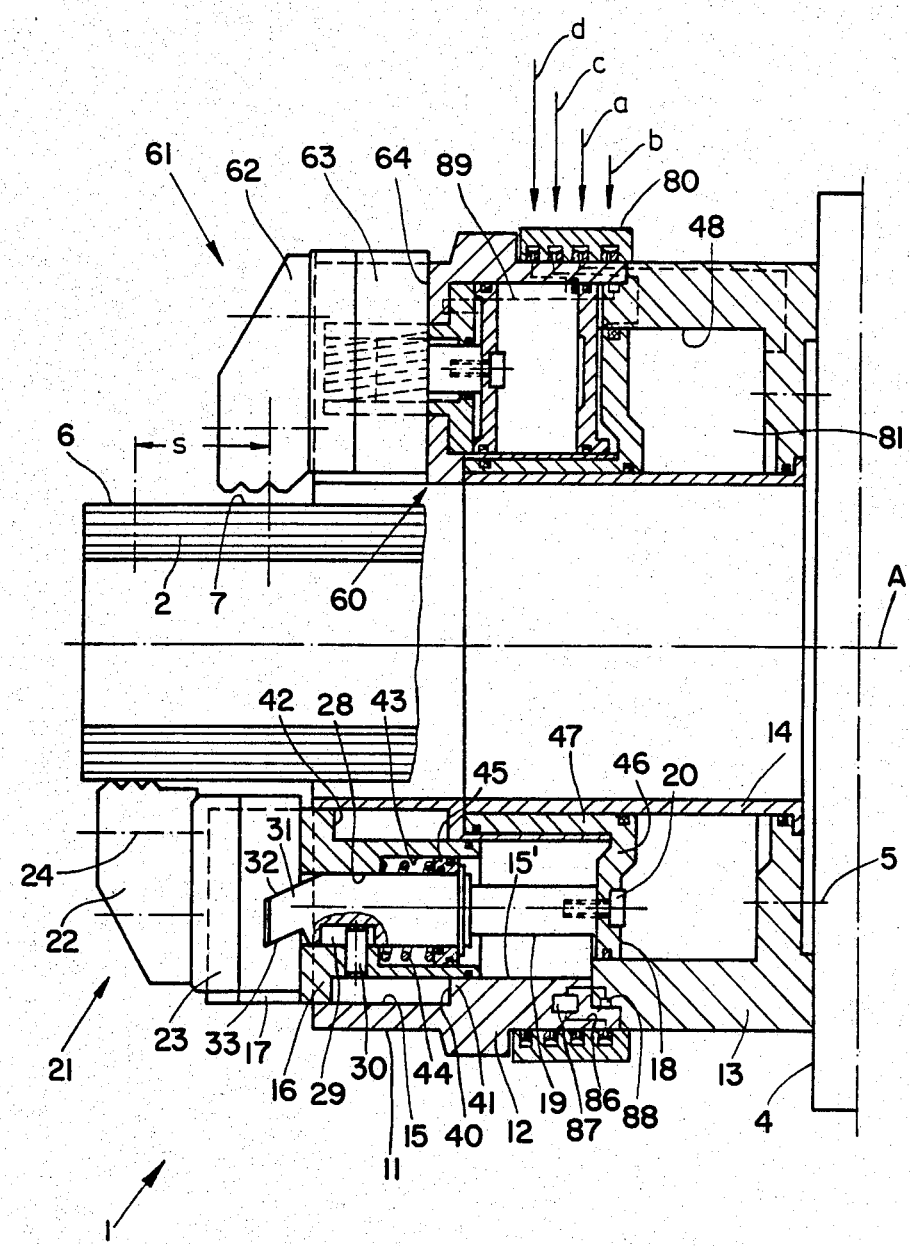
FIG. 1 is an axial sectional view of a chuck constructed in accordance with the invention which is shown attached to a machine tool showing a centered uptake of a workpiece in an axial direction.

Referring to the drawings, in particular, the invention embodied therein comprises a chuck generally designated 1 having a cylindrical body or base body 12 which has a plurality of circumferentially spaced axially extending recesses 15 opening at one end and has a central workpiece receiving bore to which a workpiece such as a drill pipe 2 is inserted. A plurality of centering jaw heads 16 which are each associated with a centering jaw set 21 are axially movably mounted in selected ones of the recesses 15 and a plurality of compensating jaw heads or means 60 of a compensating jaw head set 61 are movably mounted in the others of the recesses. The base jaws 23 and 63 for the centering jaw set 21 and the compensating jaw set 61 respectively, are mounted for radial movement toward and away from the axes of the cylindrical body bore for engaging and disengaging the workpiece. A positioning piston 18 is provided for each of the centering jaw sets and is movable in its recess and has a connecting element 19 which is engageable with a respective jaw head 16 and effective to shift the jaw head axially. The jaw head 16 may be shifted to a predetermined distance at which time it is stopped by the effect of a pin 30 engaging against an end abutment of the connecting member 19. Thereafter, the connecting member is effective to shift the base jaw 23 and its connected jaw member 22 radially inwardly to clampingly engage the workpiece after each of the associated jaw heads has come to an end position. The invention also includes a compensating position piston 69 which is movable in its recess 15 and has a compensating position piston connected to associated ones of the compensating jaw sets 61 having their base jaws 63 and connected jaw members 62, for effecting a compensating movement thereof relative to the workpiece.

Figure 2:
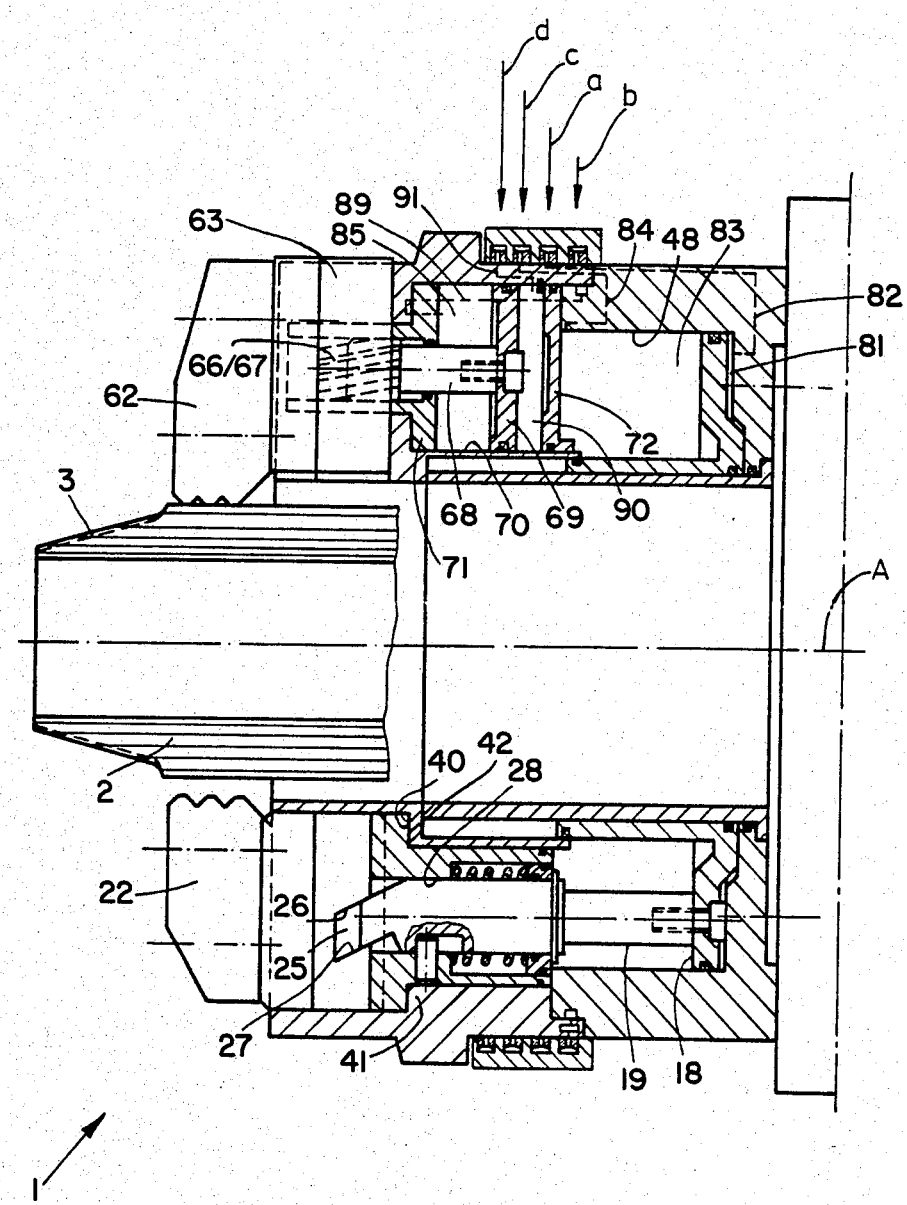
FIG. 2 is a view similar to FIG. 1 indicating a retention of the workpiece by jaws of a compensating jaw set.
Figure 3:
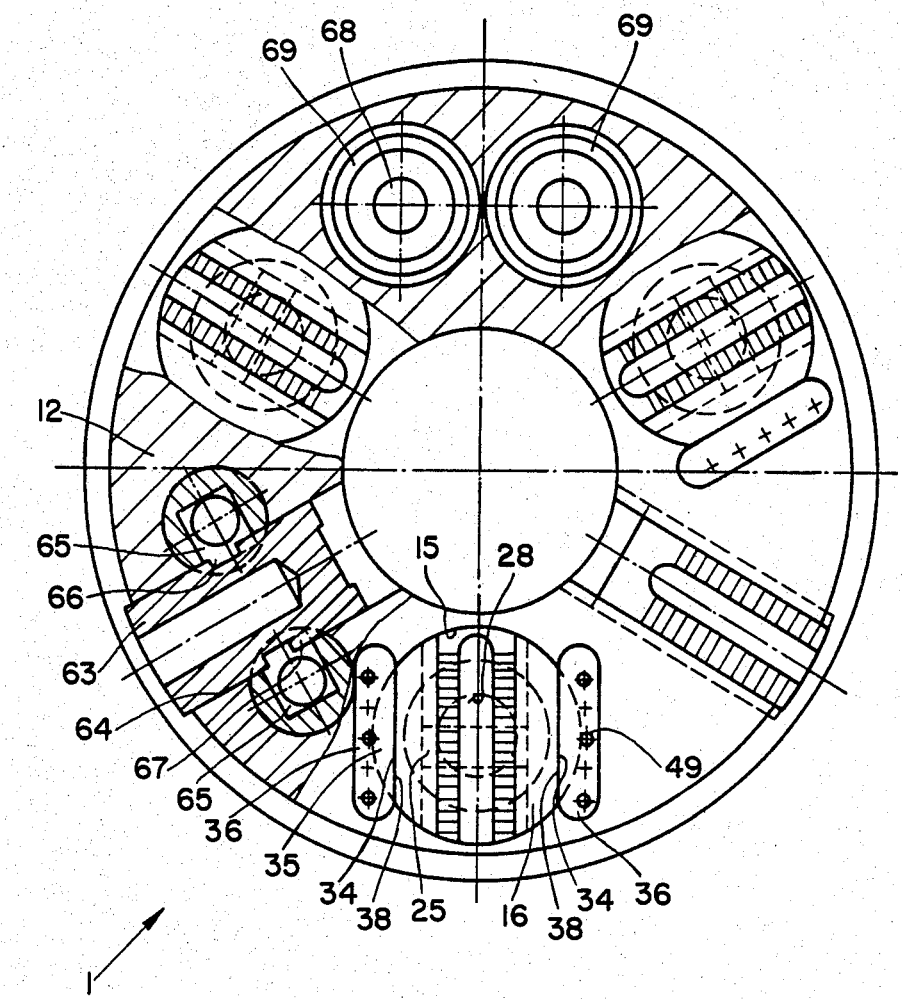
FIG. 3 is a front view, partly in section of the chuck shown in FIG. 1.

The chuck shown in FIGS. 1 and 2, marked 1, which is fastened to a machine tool 4 by screws 5, serves for the centered clamping of an irregular workpiece 2, for example a drill pipe, in a region 6 to be machined centrically, which is axially located at a selectable distance s before the actual clamping region 7 of the chuck 1. After the centered uptake of workpiece 2 in its region 6, it is compensatorily clamped in region 7, so that independently of an end curvature of workpiece 2 a thread 3 can be cut thereon in region 6, as is shown in FIG. 2.

For the centered uptake of workpiece 2 in region 6, chuck 1 is equipped with a centered jaw set 21, the jaws 22 of which are jointly adjustable axially and radially. The compensatory clamping is accomplished by means of a compensating jaw set 61 also inserted in the chuck body 11, the jaws 62 of which can be actuated with the aid of a compensation means 60. The chuck body 11 is a three-part unit and comprises a body 12, an angularly formed cylindrical cover 13 closing the latter on one end or back, and a bushing 14 inserted therein.

The centering jaws 22 are secured, fixable in different positions by screws 24, to base jaws 23 which are inserted radially displaceable in a centering jaw head 16, and these in turn are guided in corresponding bores or recesses 15 into the body 12 for axial adjustment. To this end, recesses 15 directed parallel to the longitudinal axis A of chuck 1 are machined in the base body 12, and the centering jaw heads 16 are provided with directed grooves 17, in which the base jaws 23 are displaceably held.

In the embodiment shown, the centering jaw heads 16 and base jaws 23 are rotation-symmetrical and have the same outside diameters, so that they can be worked jointly, e.g. ground. Also, the inside diameter of the recesses 15 receiving them is made of the same size, thus providing for exact guiding. Also, with the centering jaw heads 16 and base jaws 23 moved in, recess 15 is closed, so that no dirt can penetrate into it.

For the axial adjustment of the centering jaw heads 16 and of the centering jaws 22 and base jaws 23, a positioning member 8 in the form of a ring piston 46, to be admitted with pressure medium on both sides, is provided, which is inserted in an annular space 48 of the chuck body 11 and can be coupled therewith through a connecting element 19 in the form of a ram. By means of a projection 47 integrally formed on the ring piston 46 in the inner diameter region, the positioning member 18, to which the connecting elements 19 are fastened by screws 20, is supported on bushing 14 over a large area, thus precluding tilting.

In order to transform the axial adjustment movement of the positioning member 18 into a radial feed movement of the base jaws 23 and of the centering jaws 22 connected with the centering jaws, there are provided, at the ends of the connecting elements 19 facing the base jaws 23, wedge faces 32 and 33 formed by a nose 31 slanting in axial direction, and the base jaws 23 are equipped with an associated groove 25, the side walls of which form counter-faces 26 and 27. The adjustment path of the noses 31 in the grooves 25 is limited by stop pins 30 which are inserted in the centering jaw heads 16 and which engage into a cutout 29 machined into the connecting elements 19. It is thereby assured that the noses 31 are not moved out of the grooves 25 during the return movement of the centering jaw heads 16.

Figure 4:
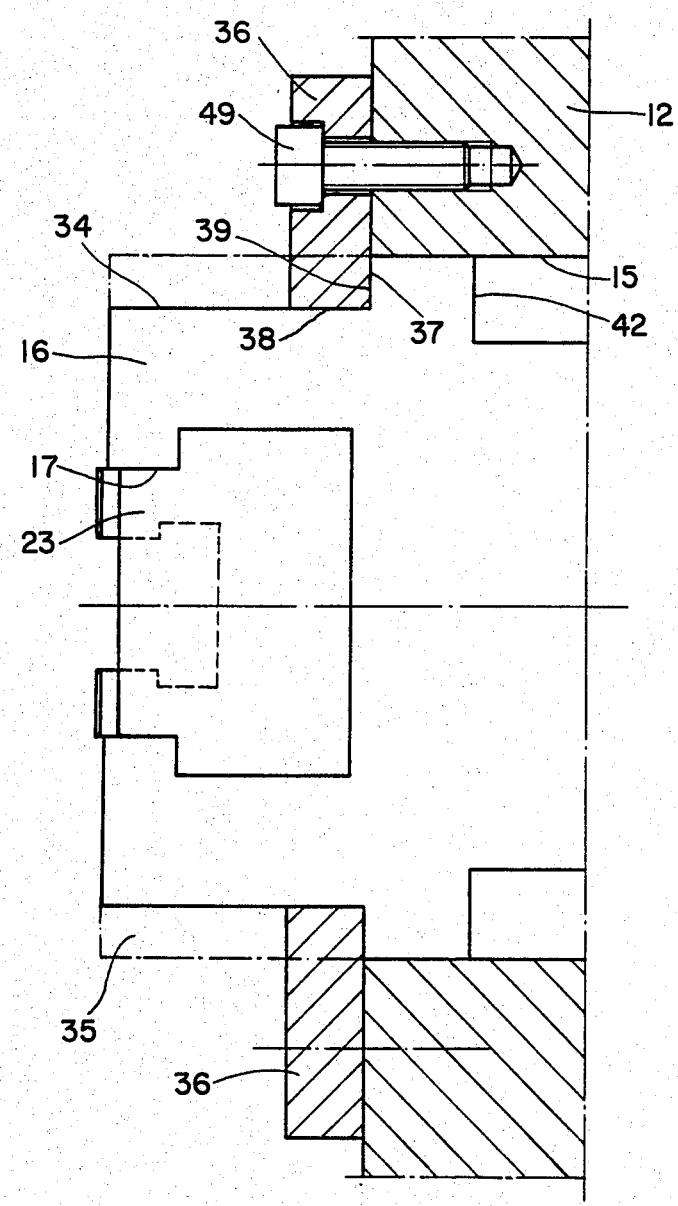
FIG. 4 is a partial longitudinal sectional view through one of the centering jaw heads which are guided in the chuck body.

The axial feed movement of the centering jaw heads 16 is likewise limited by movement limiting means. To fix the centering jaw heads 16 in their forward end position, there are fastened, as can be seen specifically in FIG. 4, on the body 12, in the region of each of the recesses 15, two stop strips 36 by means of screws, which partly cover the recesses 15 and thus form abutment surfaces 37. And since at the centering jaw heads 16, shoulders 35 are machined on, by which counter-faces 39 cooperating with the abutment surfaces 37 as well as axially extending guide surfaces 34 are created, there is further obtained also a non-rotational retention of the centering jaw heads 16, as the guide surfaces 34 take support on the end faces 38 of the abutment strips 36.

The centering jaw heads 16 are T-shaped in longitudinal cross-section, and the recesses 15 receiving them are provided with a shoulder 41, so that in this way cooperating abutment surfaces 40 and 42 are formed, by which the return movement of the clamping heads 16 is thus limited. As the centering jaw heads 16 are guided in recess 15 and also in the offset region 15' thereof during the adjustment movements, tilting is avoided.

To permit a preassembly of the connecting elements 19 and of the centering jaw heads 16, and to avoid a premature radial displacement of the base jaws 23 while these are still in the recesses 15, a compression spring 44 is inserted in each of the centering jaw heads 16 and connecting elements 19. Spring 44 is arranged in a cutout 43 machined into the centering jaw head 16 and takes support thereon and on a ring 45 placed on the connecting element 19. Only after the initial tension of spring 44 has been overcome by application of the centering jaw heads 16 against the abutment strips 36, a radial adjustment of the base jaws 23 is effected.

In the embodiment shown, the compensating device 60 consists of drive elements 65 which are displaceable in axial directions A of chuck 1 and which cooperate through oblique surfaces 66 with counter-faces 67 disposed on the base jaws 63 carrying the compensating jaws 62. The drive elements 65 are of rectangular cross-section and are arranged to both sides of the base jaws 63 displaceable radially in grooves 64 of the base body 12, the oblique faces 66 being integrally formed on the outer sides facing the base jaws 63.

Through a rod-shaped extension 68 extending parallel to the longitudinal axis A of chuck 1, which traverses a bushing 71 and is non-rotationally guided therein, there is fastened to each of the drive elements 65 a positioning piston 69 to be admitted by pressure medium on both sides, which piston is displaceably guided in a recess 70 in the base body 12. The recesses 70 are closed pressure-tight by means of disks 72.

The pressure medium is supplied to the compression chambers 81 and 83 associated with positioning member 18 and to the compression chambers 85 and 90 associated with the positioning piston 69 in a controlled manner with the aid of a pressure medium ring 80 disposed on the chuck body 11, to which rings are connected the pressure medium supply lines a, b, c and d, by means of pressure medium supply channels 82 and 84 or respectively 86 and 91 machined into the base body 12 and cover 13. The compensatory clamping can be accomplished with the aid of an annular chamber 88, in which the pressure can be maintained by releasable check valve 87 installed in the supply channel 86 even when the pressure medium supply is cut off, and which is connected through lines 89 with all pressure chambers 85.

Chuck 1 thus makes it possible to clamp an irregular workpiece, for example a drilling pipe usually having an inevitable end curvature, in the region 6 to be machined, in centered position, and to firmly hold it in this position in another plane to be able to carry out a machining of region 6. This is effected, after insertion of workpiece 2 in chuck 1, by first displacing the centering jaws 22 of centering jaw set 21 axially by the adjustment path of the centering jaw heads 16 and then feeding them radially in the direction of workpiece 2 until they apply firmly against it, thus centering it.

As the centering jaws 22 are adjusted jointly, a centered uptake of workpiece 2 in region 6 is ensured.

The feed of the centering jaw heads 16 is effected by means of the positioning member 18, in that, starting from the end position shown in FIG. 2 in the lower half, pressure medium is supplied to compression chamber 81 through the pressure medium supply line a and the pressure medium channel 82. By the pressure building up in compression chamber 81 the positioning chamber 18 is displaced to the left. Through the connecting elements 19 fastened to position member 18 and through the tensioned compression spring 44 the adjustment movement of the positioning member 18 is transmitted to the centering jaw heads 16 and by way of them to the applied base jaws 23. During this adjustment movement no force is exerted on the base jaws 23 by the wedge faces 32, so that there is no increased friction force by application of the base jaws 23 against the inner wall of recess 15 that must be overcome. But as soon as the centering jaw heads 16 apply by the faces 39 against the abutment faces 37 of the abutment strips 36 and are thus fixed—in this state the base jaws 23 are outside the recesses 15—the axial adjustment movement of positioning member 19 is transformed ("defected") by way of the wedge faces 32 and counter-races 26 cooperating therewith into a radial feed movement of the base jaws 23. Depending on the length and inclination of the noses 31 by which the wedge faces 32 and 33 are formed, the adjustment path of the base jaws 23 and hence also of the centering jaws 22 as well as the translation of the initiated clamping force exerted by the positioning member 18 can be controlled.

While a specific embodiment of the invention has been shown and described in detail to illustrate the application of the principles of the invention, it will be understood that the invention may be embodied otherwise without departing from such principles.

What is claimed is:

1. A chuck for lathe or similar machine tool, comprising:
    a chuck body (12) having an axis (A) and a plurality of axially extending recesses (15);
    a compensating jaw set (61) movably mounted on said body, having a compensating jaw (62) and actuatable to engage the compensating jaw on an irregular workpiece at an axial location with respect to the chuck body;
    compensating means (60) mounted in one of said recesses and connected to said compensating jaw set for the actuation thereof;
    a plurality of centering jaws sets (21) movably mounted on said body and actuatable independently of said compensating jaw set, each centering jaw set having a centering jaw (22) engageable with a workpiece upon actuation of its centering jaw set to engage the workpiece at a location axially spaced from said axial location of engagement for said compensating jaw;
    each centering jaw set (21) comprising, a base jaw (23) mounted for movement normal to said longitudinal axis (A) and carrying said centering jaw (22), and a centering jaw head (16) movably mounted in another recess other than the recess containing said compensating means, for limited axial displacement therein;
    a positioning member (18) axially movable in said other recess;
    a ram type connecting element (19) arranged and movable parallel to said axis (A) and coupled between said positioning member and said base jaw, said connecting element having wedge surfaces (32,33) inclined with respect to said axis (A);
    said base jaw (23) having counter-surfaces (26,27) engaged with said wedge surfaces of said connecting element so that axial movement of said connecting element produces radial movement of said base jaw with respect to said axis;
    said connecting element (19) engaged with said centering jaw head (16) for axially moving said centering jaw head with axial movement of said connecting element; and
    movement limiting means associated with said other recess for limiting the axial movement of said centering jaw head (15) in said other recess;
    there being one connecting element (19) for each centering jaw head (16).

2. Chuck according to claim 1, wherein the connecting elements (19) traverse the clamping heads (16) associated with them in a centered recess (28) machined into the latter.

3. Chuck according to claim 1 wherein the wedge surfaces (32,33) provided for radial displacement of the base jaws (23) are formed by a nose (31) inclined in axial direction which is provided at the end of the connecting element (19) facing said counter surfaces, said noses engaging in an associated groove (25) machined into the base jaws (23).

4. Chuck according to claim 1, wherein the clamping jaw heads (16) and the base jaws (23) inserted are cylindrical with equal outside diameters, while the recesses (15) receiving them are formed as cylindrical bores.

5. Chuck according to claim 1, wherein for non-rotational retention of the centering jaw heads (16) these are provided with two diametrically opposite, axis-parallel guide faces (34) which apply against counter-faces (38) on the chuck body (12).

6. Chuck according to claim 1, wherein the displacement path of the center jaw heads (16) is limited at least in a feed direction by a stop provided on the chuck body (12) acting as said limiting means.

7. Chuck according to claim 6, wherein the stops for limiting the feed movement of the jaw heads (16) are formed by stop strips (36) which are arranged on an end face of the chuck body and which partially cover the recesses (15) receiving the jaw heads (16) on one or both sides, and with there cooperate abutment faces (39) formed at the jaw heads (16) by shoulders (35).

8. Chuck according to claim 6, wherein the stops limiting the return movement of the jaw heads (16) are each formed by a shoulder (41) provided in the recess (15), by which shoulder the jaw head (16), which are T-shaped in longitudinal section, cooperates with an abutment surface (42).

9. Chuck according to claim 1, wherein to limit the return movement of the centering jaws (22) the connecting elements (19) are provided with a cutout (29) extending in axial direction, while the associated jaw head (16) is provided with a stop pin (30) which engages into the cutout (29).

10. A chuck for machine tools, comprising a cylindrical body having an axis and a plurality of circumferentially spaced axially extending recesses opening at one end and having a central workpiece receiving bore, a plurality of centering jaw heads axially movable mounted is selected ones of said recesses, a plurality of compensating jaw heads axially movably mounted in the others of said recesses, a base jaw mounted on each centering jaw head for radial movement toward and away from the axis of said cylindrical body for engaging and disengaging a workpiece, a positioning piston for moving all of the centering jaw heads in their associated recesses and having a connecting element engageable with the respective centering jaw head for moving it axially and engaged with said base jaw for moving said base jaw radially, said connecting element being effective after movement of said centered jaw head in an axial direction by a predetermined amount to shift said base jaw radially, stop means in the path of movement of said centering jaw head to stop said centering jaw head in an end position after moving the predetermined amount, said connecting member being movable after the centering jaw head is positioned in the end position to effect the radial shifting of said base jaw, a compensating position piston movable in one of said other recesses and having a compensating position piston connected to associated ones of said compensating jaw heads for effecting a compensating movement thereof relative to the workpiece, and means for selectively moving said positioning piston and said compensating position piston.

11. A chuck according to claim 10, wherein said means on connecting element for effecting movement of said base jaws comprises a wedge-shaped engagement edge engageable with a complementary wedge-shaped edge of said base jaws so that axial movement of said connecting member effects radial movement of said base jaws.

12. A chuck according to claim 10, wherein said connecting element comprises a piston member having an axially elongated rod portion terminating in a wedge-shaped end engaged with a complementary-shaped end of said base jaw including spring means acting on said connecting member against the direction of movement or on said centering jaw head and being compressible when said centering jaw head moves to its end position.

* * * * *